United States Patent
Chen et al.

(10) Patent No.: US 12,432,403 B2
(45) Date of Patent: Sep. 30, 2025

(54) METHODS AND SYSTEMS FOR QUALITY OF EXPERIENCE MEASUREMENTS

(71) Applicant: Adeia Guides Inc., San Jose, CA (US)

(72) Inventors: Tao Chen, Palo Alto, CA (US); Reda Harb, Issaquah, WA (US)

(73) Assignee: Adeia Guides Inc., San Jose, CA (US)

( * ) Notice: Subject to any disclaimer, the term of this patent is extended or adjusted under 35 U.S.C. 154(b) by 217 days.

(21) Appl. No.: 18/084,005

(22) Filed: Dec. 19, 2022

(65) Prior Publication Data

US 2024/0205474 A1    Jun. 20, 2024

(51) Int. Cl.
*H04N 21/24*    (2011.01)
*H04N 21/414*    (2011.01)

(52) U.S. Cl.
CPC ... *H04N 21/2407* (2013.01); *H04N 21/41407* (2013.01)

(58) Field of Classification Search
CPC .............. H04N 21/2407; H04N 21/41407
See application file for complete search history.

(56) References Cited

U.S. PATENT DOCUMENTS

| | | | |
|---|---|---|---|
| 9,712,860 B1 * | 7/2017 | Waggoner | H04N 21/23439 |
| 2012/0311126 A1 * | 12/2012 | Jadallah | H04L 65/80 |
| | | | 709/224 |
| 2015/0213316 A1 * | 7/2015 | Vunic | G11B 27/034 |
| | | | 386/278 |
| 2021/0152892 A1 | 5/2021 | Ramaswamy | |
| 2022/0286755 A1 | 9/2022 | Tirella et al. | |
| 2023/0144621 A1 * | 5/2023 | Enten | G06V 10/82 |
| | | | 351/206 |

FOREIGN PATENT DOCUMENTS

WO    2014209495 A1    12/2014

OTHER PUBLICATIONS

G. Cofano, et al., "Design and Experimental Evaluation of Network-assisted Strategies for HTTP Adaptive Streaming," ACM Transactions on Multimedia Computing, Communications, and Applications, vol. 35, pp. 1-24, Nov. 2017.
ITU-T Rec. P.1203: Parametric bitstream-based quality assessment of progressive download and adaptive audiovisual streaming services over reliable transport, Nov. 2016.
G. Heikkila, J. Gustafsson, "Leveraging standards for video QoE", Ericson Technology Review, Jun. 2017.
E. Liotou, D. Tsolkas, N. Passas, L. Merakos, "Quality of experience management in mobile cellular networks: key issues and design challenges," IEEE Communications Magazine, vol. 53, No. 7, pp. 145-153, 2015.

(Continued)

*Primary Examiner* — Chenea Davis
(74) *Attorney, Agent, or Firm* — HALEY GUILIANO LLP

(57) ABSTRACT

There is provided systems and methods for estimating quality of experience, QoE, for a media stream. The systems and methods comprise receiving a first window of frames of the media stream, receiving a second window of frames of the media stream, measuring a plurality of metrics relating to the first and the second windows of frames, aggregating the plurality of metrics for each window of frames, and determining a window quality of experience value based on the aggregated plurality of metrics.

18 Claims, 10 Drawing Sheets

(56) References Cited

OTHER PUBLICATIONS

M. Varela, et al., "From Service Level Agreements (SLA) to Experience Level Agreements (ELA): The challenges of selling QoE to the user," IEEE International Conference on Communication Workshop (ICCW), pp. 1741-1746, Jun. 2015.

A. Ahmad, A. Floris, L. Atzori, "QoE-aware service delivery: A joint-venture approach for content and network providers," Eighth International Conference on Quality of Multimedia Experience (QoMEX), pp. 1-6, Jun. 2016.

P. Madhusudana, et al., "Subjective and objective quality assessment of high frame rate videos", IEEE Access, vol. 9, 108069, 2021.

C. G. Bampis, et al., "Study of temporal effects on subjective video quality experience", IEEE Transactions on Image Processing, vol. 26, No. 11, Nov. 2017.

"Measuring video quality and performance: best practices", Whitepaper by Akamai, May 2020.

ITU-T Rec. P.910, "Subjective Video Quality Assessment Methods for Multimedia Applications, document", 2008.

D. Ghadiyram, J. Pan, A. C. Bovik, "Learning a continuous-time streaming video QoE model", IEEE Transactions on Image Processing, vol. 27, No. 5, May 2018.

H. Otroshi-Shahreza, A. Amini, H. Behroozi, "Feature-based No-Reference Video Quality Assessment using Extra Trees", IET Journal Image Processing, p. 1-10, 2022.

M. Seufert, et al., "Features that Matter: Feature Selection for On-line Stalling Prediction in Encrypted Video Streaming", Proceedings of IEEE Infocomm, pp. 688-695, 2019.

O. Izima, R. de Ferin, A. Malik, "A Survey of Machine Learning Techniques for Video Quality Prediction from Quality of Delivery Metrics", MDPI Journal Electronics, vol. 10, 1022851, Nov. 2021.

"3rd Generation Partnership Project; Technical Specification Group Services and System Aspects; Study on improved streaming Quality of Experience (QoE) reporting in 3GPP services and networks (Release 17)" (https://ftp.3gpp.org/3guInternal/).

* cited by examiner

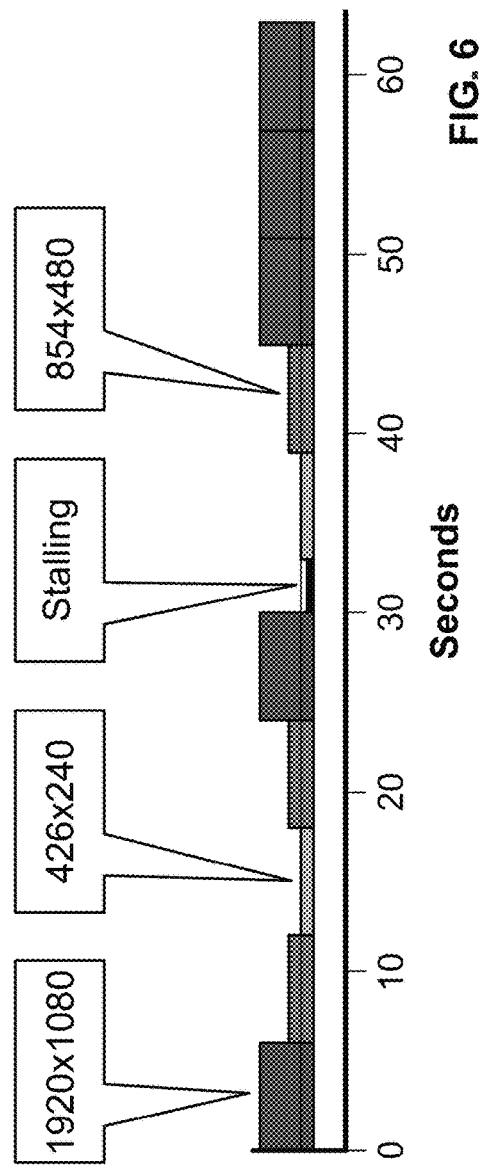
FIG. 6
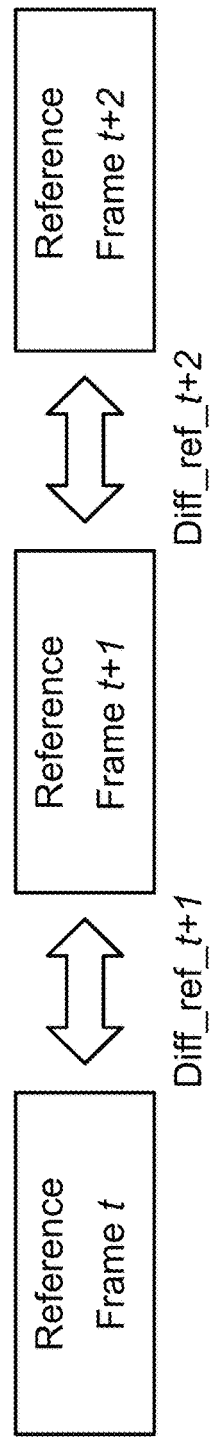
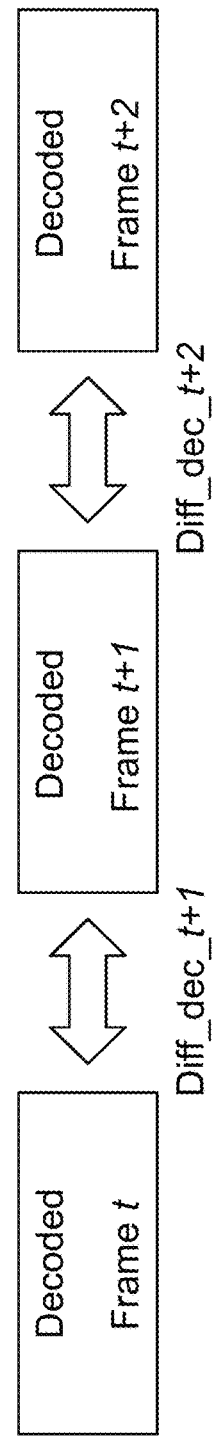
FIG. 7A

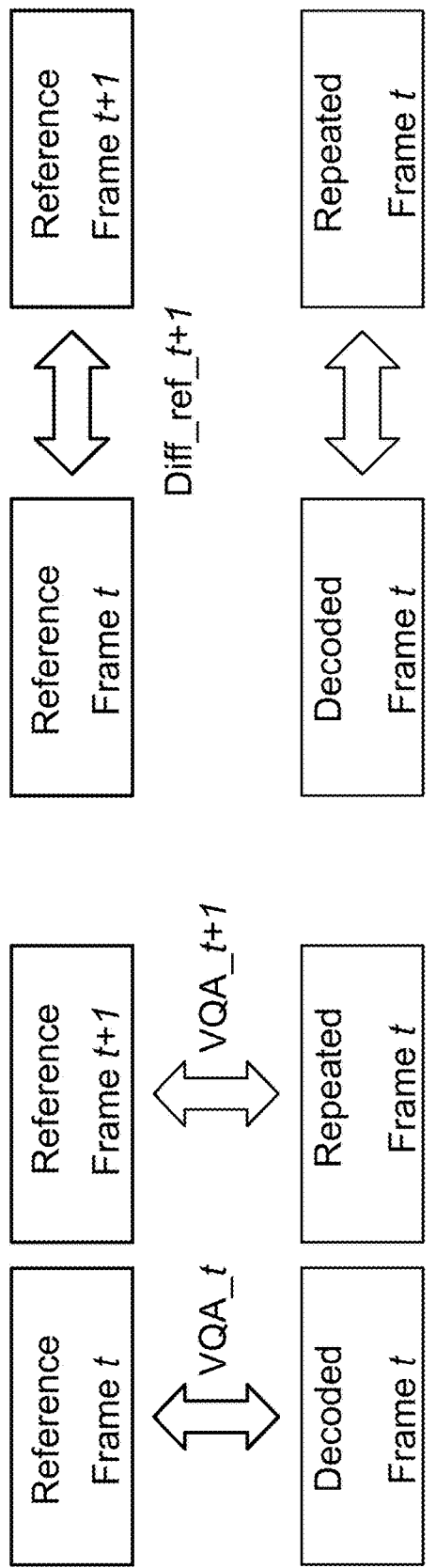
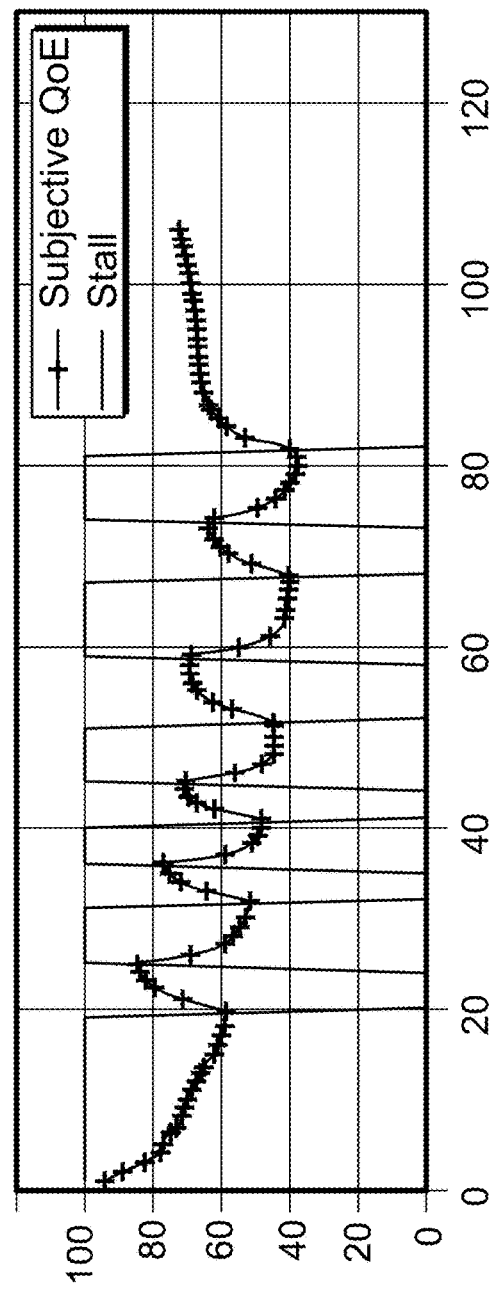
FIG. 7B
FIG. 7C
FIG. 7D

```
 0 | <?xml version="1.0" encoding="UTF-8"?>
 1 | <MPD xmlns:xsi="http://www.w3.org/2001/XMLSchema-instance" xmlns="urn:mpeg:dash:schema:mpd:2011 DASH-MPD.xsd
 2 | <BaseURL>https://video.platform.com/v1</BaseURL>
 3 | <Period>
 4 | <!-- English Audio --> <QOETAG="0" Priority="Low">
 5 | <AdaptationSet mimeType="audio/mp4" codecs="mp4a.40.5" lang="en" subsegmentAlignment="true" subsegmentStartsWithSAP="1">
 6 | <Representation id="0" bandwidth="64000">
 7 | <URL>JoelsLatestAlbum_AAC48K_064.mp4.dash</BaseURL>
 8 | </Representation>
 9 | </AdaptationSet>
10 | <!-- Video -->
11 | <AdaptationSet mimeType="video/mp4" codecs="avc1.42401E" subsegmentAlignment="true" subsegmentStartsWithSAP="1">
12 | <Representation id="1" bandwidth="1000000" width="2160" height="1440"><QOETAG="1" Priority="High">
13 | <URL>BigNewMovie_H264BPL30_0100.264.dash</BaseURL>
14 | </Representation>
15 | <Representation id="2" bandwidth="2000000" width="3840" height="2160"><QOETAG="0" Priority="Low">
16 | <URL>PersonalAd1_H264BPL30_0200.264.dash</BaseURL>
17 | </Representation>
18 | </AdaptationSet>
19 | </Period>
20 | </MPD>
```

FIG. 8

```
1  <Representation id="1" codecs="avc1" mimeType="video/mp4" width="2160" height="1440" startWithSAP="1">
2    <SegmentList duration="3">
3      <SegmentURL media="main/NewShow1/2.m4s" mediaRange="863-7113"><QOETAG="L"/>
4      <SegmentURL media="main/MostPopularShow/3.m4s" mediaRange="7114-14104"><QOETAG="M"/>
5      <SegmentURL media="main/NewShow1poster.m4s" mediaRange="0-1"><QOETAG="H"/>
6    </SegmentList>
7  </Representation>
8  <Representation id="2" codecs="avc1" mimeType="video/mp4" width="3840" height="2160" startWithSAP="1">
9    <SegmentList duration="3">
10     <SegmentURL media="main/TeaserTrailer1/2.m4s " mediaRange="865-11523"><QOETAG ="L"/>
11     <SegmentURL media="main/TeaserTrailer2/3.m4s" mediaRange="11524-25621"><QOETAG ="M"/>
12     <SegmentURL media="main/CinematicTrailer1/4.m4s" mediaRange="25622-33693"><QOETAG ="H"/>
13   </SegmentList>
14 </Representation>
```

FIG. 9

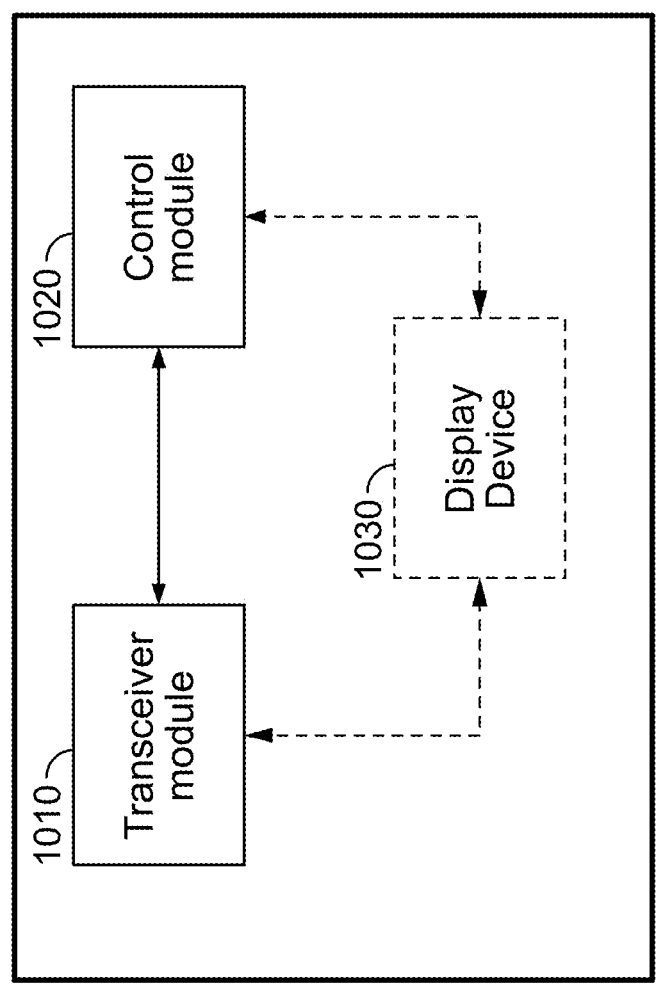
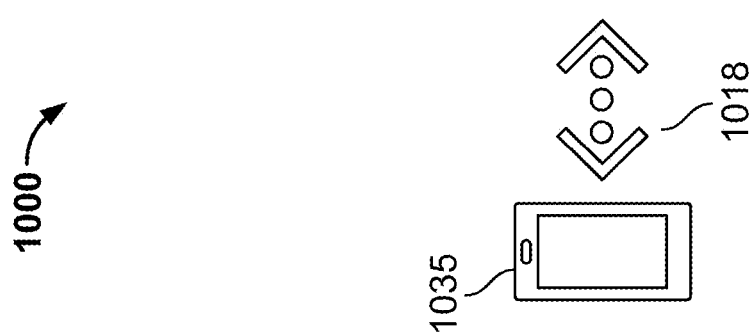
FIG. 10

METHODS AND SYSTEMS FOR QUALITY OF EXPERIENCE MEASUREMENTS

FIELD

The present disclosure relates to methods and systems for estimating the quality of experience and, more particularly, to systems and related processes for optimizing and estimating the quality of experience in client-driven video streams.

BACKGROUND

In the past few years, the number of people turning to the internet for news, entertainment, education, and more has increased exponentially. Over-the-top (OTT) video consumption is consistently rising, with predictions that the online streaming market will be worth $1039 billion by the year 2027. There is heavy competition between OTT service providers, to promote their content to users and increase subscriber count, especially as new service providers enter the market. Accordingly, with such a diverse range of offerings, and users/households typically having access to more than one provider, users watch content across a plurality of different OTT providers.

Often, users have access to a content aggregator, such as Google TV, Apple TV, or a smart TV. When content aggregators, or OTT service providers in general, are launched (e.g., the user selects an application), users want access to their content as soon as possible, ideally immediately. "Loading spinners," an icon shown to the user that typically rotates or spins on-screen, is visually unattractive and frustrate users, and similarly, static images are not entertaining nor stimulating to a user—and sometimes lead to confusion on whether the application has frozen or become unresponsive. This poor QoE for a user is often avoidable if the streaming is optimized accordingly.

In video streaming services, the standard-based architecture may install a probe inside the network. The probe then monitors video traffic using different levels of packet inspection and gathers data to be used for a quality of experience (QoE) estimation. When a video stream is not encrypted, the relevant metrics from the video streams can be readily obtained and utilized. However, when a stream is encrypted, it is very challenging to obtain any data. In this circumstance, QoE estimation can still be performed to some extent by using a combination of standardized and proprietary models. The ability to report quality-related metrics directly from the end user enables a much more accurate estimation of QoE.

By definition, video QoE is distinct from the parameters describing the network condition and packet losses. Any solution that purports to build a video QoE metric only from those factors will be less effective in assessing the perceived video quality by the end users. For instance, video stalling due to rebuffering and video quality variations from frequent bitrate switches will impose challenges for the serve to accurately estimate the video QoE. The temporal naturalness and motion smoothness in video playback will require better solutions to quantify the client QoE, which is more than what is designed to work on a frame-by-frame basis. QoE metrics should be agnostic to encryption so that the solution applies to today's and tomorrow's services, as security is becoming increasingly important for end consumers.

It is also noteworthy that valuable insight into subjective video quality assessment (VQA) values often lack scientific objectivity, scalability, repeatability, etc. It is thus not as reliable in measuring video quality for the production and distribution stakeholders, e.g., the service providers and network operators. For this reason, the focus has been on repeatable and objective quality measurement methods.

Video streaming of live or pre-stored content accounts for most of the traffic on the Internet. There exists a range of business motivations for service providers to monitor the end users' video quality of experience (QoE). With the right solution implemented, every video playback is a chance to measure and monitor the user QoE. When a solution is ignorant of the actual end-user QoE, every video playback is a missed opportunity. By understanding the truly measured video QoE from the end user's perspective, service providers will be able to make an informed decision and choose the most suitable solution for improvement.

SUMMARY

The QoE metrics collected from the feedback of end users should be monitored and leveraged to adjust parameters at the streaming server so that improvement to the client QoE can be achieved. The relative comparison of QoE metrics over time indicates improvement or degradation of an existing system, which may be better tuned to account for the change in QoE.

In a simplified pipeline of adaptive bitrate streaming, video segments are encoded at different quality levels, segments are typically chosen based on network conditions and an appropriate bitrate selection is made. In a sophisticated setup, it is possible to enable monitoring the feedback from clients and also communicating recommendations to clients.

Using a QoE-based network-assisted architecture approach for adaptive video streaming with multiple clients, it is possible to collect relevant quality parameters from both the network and client sides when a centralized node is in place. The client-side data may include the device type, screen size, the bitrate of the video, and the buffer occupancy level. On the network side, the QoE-related parameter measurements include the number of clients, the available bandwidth, etc. The centralized node has a comprehensive view of the streaming service, which makes it possible to select the best bitrate for each client. In the case of a mobile network operation, the standard-based architecture is to install a probe inside the network. The probe monitors video traffic using different levels of packet inspection and gathers data for estimation of QoE, e.g., ITU-T Rec. P.1203.

Therefore, a video QoE metric is ideally implemented with a good understanding of the streaming technology and architecture deployed by different service providers. In other words, it can interpret and determine the specifics depending on operating systems, client devices, DASH implementation, etc.

There has been an established understanding of the requirements for client-side video QoE metrics, in addition to the server-side predictions and estimations. This invention proposes a client-driven QoE solution that: is scalable and configured to run at a low cost in computation, which is highly desirable in mobile video streaming; provides measurements of frame-level quality, spatial domain ignorant of error concealment, regardless of the network or buffering conditions; provides measurements of temporal naturalness and smoothness in the playback, and the variations of quality over time, regardless of the network or buffering conditions; can be optimized for the content of different genres, which can be distinguished by annotation through either creative metadata or auto-detection in encoding production.

Measuring the viewers' QoE is very challenging as the video QoE is highly subjective. However, many studies have shown that although individual preferences vary, the QoE of users converges to a particular trend. The QoE metrics collected from the feedback of end users should be monitored and leveraged to adjust parameters at the streaming server so that improvement to the client QoE can be achieved. It is more important to implement solutions for optimizing and improving QoE than collecting metrics with no real goal. The relative comparison of QoE metrics over time indicates improvement or degradation of an existing system, which may be tuned better.

Accordingly, in a first aspect of the invention, there is provided a method for estimating quality of experience, QoE, for a media stream. The method comprises receiving a first window of frames of the media stream; receiving a second window of frames of the media stream; measuring a plurality of metrics relating to the first and second window of frames; aggregating the plurality of metrics for each window of frames; and determining a window quality of experience value based on the aggregated plurality of metrics.

In some examples, the method further comprises receiving a trigger in the media stream; and in response to receiving the trigger, creating the first window of frames. In some examples, the method further comprises detecting an event in the media stream; and in response to detecting the event, creating the first window of frames. For example, there might be a live event where the number of user peaks in short period of time, in response to detecting such an event, the service provider can collect QoE values from various clients during the event. The event may be an increase in the number of users in a location, for example, at a sporting event.

In some examples, the trigger is associated with a point of interest in the media stream, the point of interest being one of: scene complexity, genre, bitrate data, segment complexity, scene content, or historical data.

In some examples, the method further comprises taking a corrective action on the media stream based on the quality of experience value, wherein the corrective action is selected to improve at least one of the plurality of metrics.

In some examples, aggregating the plurality of metrics further comprises weighting each metric based on a configurable importance.

In some examples, the window quality value is a zero-centered value that shows the variation of quality of experience over time between the first window of frames to the second window of frames.

In some examples, the method further comprises determining that the media stream is being played on a portable device; determining a battery charge percentage of the portable device; and increasing a time offset between the first window of frames and the second window of frames based on an inverse proportionality to the battery charge percentage of the portable device.

In some examples, the first and the second windows of frames are reference frames that comprise reduced data density relative to corresponding frames in the media stream.

In some examples, the first and the second windows of frames comprise consecutive frames. In some examples, the first and the second windows of frames overlap. In some examples, the first and the second windows of frames do not overlap. In some examples, the second window of frames are following the frames of the first window.

In some examples, the method is carried out in parallel to a user consuming the media stream on a user device. In some examples, the media stream is a progressive media stream, and the measured plurality of metrics are associated with progressive media streaming. In some examples, the media stream is an adaptive media stream, and the measured plurality of metrics are associated with adaptive media streaming.

In another approach, there is provided an apparatus for estimating quality of experience, QoE, for a media stream, the apparatus comprising a transceiver module and a control module. The transceiver and control module are configured to: receive a first window of frames of the media stream; receive a second window of frames of the media stream; measure a plurality of metrics relating to the first and the second windows of frames; aggregate the plurality of metrics for each window of frames; and determine a window QoE value based on the aggregated plurality of metrics.

In another approach, there is provided a non-transitory computer-readable medium having instructions encoded thereon for carrying out a method. The method comprises receiving a first window of frames of the media stream; receiving a second window of frames of the media stream; measuring a plurality of metrics relating to the first and the second windows of frames; aggregating the plurality of metrics for each window of frames; and determining a window quality of experience value based on the aggregated plurality of metrics.

In another approach, there is provided a system for estimating quality of experience, QoE, for a media stream. The system comprises means for receiving a first window of frames of the media stream; means for receiving a second window of frames of the media stream; means for measuring a plurality of metrics relating to the first and the second windows of frames; means for aggregating the plurality of metrics for each window of frames; and means for determining a window quality of experience value based on the aggregated plurality of metrics.

Accordingly, there are presented herein methods, systems, and apparatus for estimating the quality of experience for a media stream and, more particularly, to systems and related processes for optimizing and estimating the quality of experience in client-driven video streams. However, it should also be understood that the same methods, systems, and apparatus also apply to platforms that media streams and the like, in general, apply to, and should not be thought to be limited to over-the-top platforms, per se. For example, the present disclosure would equally apply to home media streaming, second-device streaming, and wireless and wired streaming devices and applications thereon.

BRIEF DESCRIPTION OF THE DRAWINGS

Examples of the invention are further described hereinafter with reference to the accompanying drawings, in which:

FIG. 6 illustrates variable bitrates and stalling in a 60-second stream, in accordance with some examples of the disclosure;

FIGS. 7A-7D illustrate the measurement of video quality variations at bitrate changes and comparisons, in accordance with some examples of the disclosure;

FIG. 8 is a pictorial representation of an exemplary manifest, in accordance with some examples of the disclosure;

FIG. 9 illustrate an exemplary pseudo-code for flagging a window for a QoE analysis and priority of media content items in a manifest, in accordance with some examples of the disclosure;

FIG. 10 illustrates an exemplary media transmission device, in accordance with some examples of the disclosure.

DETAILED DESCRIPTION

Figure 1:
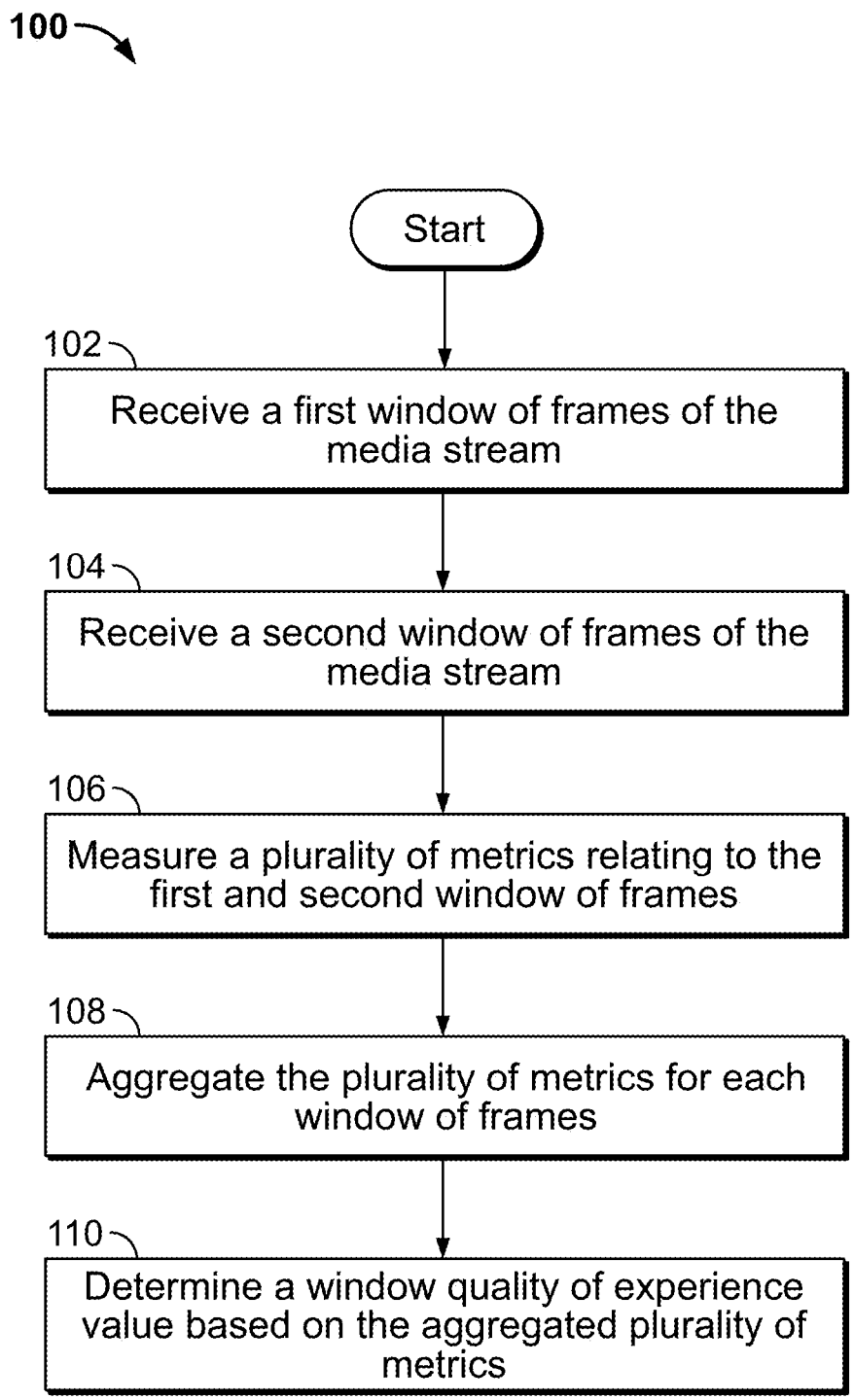
FIG. 1 illustrates an exemplary flowchart of the processing involved in estimating quality of experience, in accordance with examples of the disclosure.

As briefly mentioned above, OTT is short for "over-the-top," which refers to a method of media distribution that serves as an alternative to traditional satellite or cable television. We are entering a future in which most media is delivered and consumed via the internet. OTT technology is distributing more and more media each day. Some industry leaders advocate that we stop differentiating between OTT and broadcast TV entirely. An OTT streaming service is an application ("app") or website that viewers turn to access their favorite programs and movies. These services are accessible on all sorts of internet-enabled devices, including smart TVs, gaming consoles, computers, laptops, smartphones, and tablets. Typically, OTT streaming services limit access to paying viewers. Viewers can pay for access on a pay-per-view basis, or they can subscribe for unlimited on-demand access to the platform. Sometimes, broadcasters monetize their content with sponsored advertisements.

There are many OTT streaming services on the market. Some of these are niche services, and others have broader offerings and are geared towards a more general audience. Some focus on OTT live streaming and others only offer on-demand content. Most offer free content, premium content, or a mix of both. What all OTT streaming services have in common is that they all use the internet to deliver video content.

There are many different types of objective QoE models, depending on the intended usage and the kind of input data. For instance, some models use a limited set of input parameters to computer a parametric estimation based on bitrates, resolutions, frame rates, detail of stalling instances, etc. These factors provide the minimum amount of information regarding the video playout. More complex models may improve the estimation accuracy by processing a complete bitstream, or even the fully decoded video.

With no-reference video quality assessment (VQA) models, input is taken only from the receiving end. The bitstream parameters, which are good choices for complexity estimation, are not ideal for quality measurement. Full-reference models can also be adopted, where the video originally transmitted is compared with the one that is received. It is practically prohibitive to send the uncompressed source for full-reference VQA. Reduced-reference model is another variant, and the original video is not needed, but certain information about it is made available. Such solutions have the advantage of providing features such as a good description of source characteristics with a small overhead. These will be discussed in more detail with reference to FIGS. 7A-7C below.

Objective VQA models have been mostly used to evaluate quality based on relatively short videos. In the case of video streaming, quality can vary significantly during a given session. The models must also assess how long-term temporal variations would affect the user's QoE. Hence, there is a need for continuous-time, long-term evaluation of video quality, such as that disclosed herein.

Some important considerations for such video QoE solutions include that in each video streaming session, the QoE solution produces several measurements to cover different quality aspects. These measurements can be assessed as they are or can be pooled into a single QoE score. The intention is not to provide a right or wrong answer as to which is better, but rather enable a service provider to select a solution that can deliver a metric to clearly indicate the user's QoE for a video stream and provide access to the foundational measurements used in the final metric score. In some examples herein, a window of frames is chosen to quantify the quality of experience, referred to as a window QoE value. The window QoE value can be determined for a plurality of windows, aggregating the results to assess when a substantive change in QoE has occurred.

In addition, another consideration is that, for an effective interpretation of results, a service provider should rely on a calibrated system. It may be in relative terms (i.e., better, or worse than), or absolute terms (i.e., against an immutable scale). To give the most insight and meaning, the QoE solution should be calibrated against real-world user experiences and executed over a sufficient period. However, the period will have to vary based on the circumstances of the user and/or user device. For example, on a portable device, such as a mobile device, polling for QoE values every frame would be complex and energy costly; whereas this limitation is unlikely felt on a PC over a fiber internet connection.

Moreover, it is arguable that future users' satisfaction levels should not be defined based on Quality of Service (QOS) as increasingly more common in today's networks. It would be more beneficial that user satisfaction levels are described on experience level agreements, mechanisms which are purely based on users' QoE. This will improve and simplify the service planning by modeling future systems' performance concerning the QoE of end users. The aspect of user turnover remains the most critical, and highly correlated, to the businesses of streaming services. An objective measurement of the user turnover as a function of the predicted QoE has been proposed in the past, nevertheless, the subjective validation of user turnover on a QoE model needs more investigation.

Figure 4:
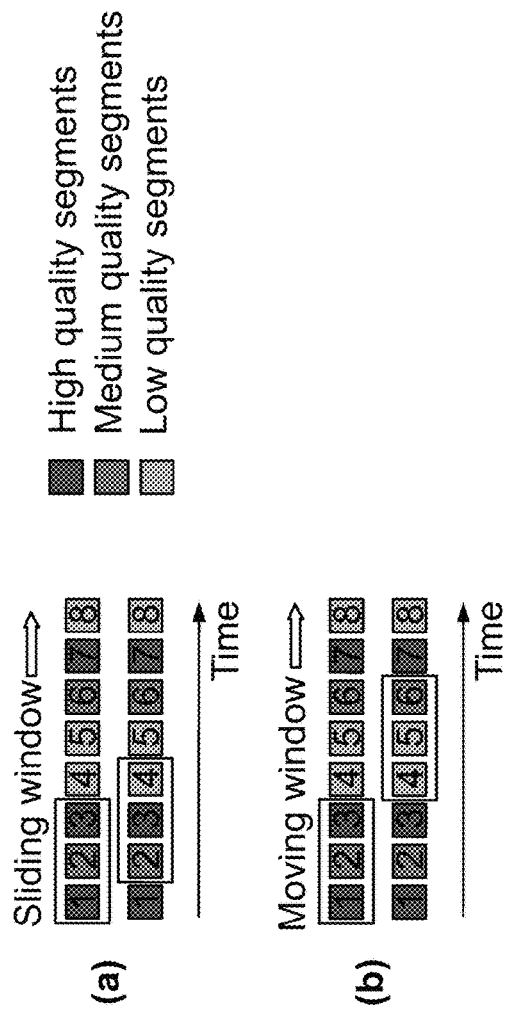
FIG. 4 illustrates window-based frame analysis for QoE computations, in accordance with some examples of the disclosure.

FIG. 1 illustrates an exemplary flowchart of the processing involved in estimating the quality of experience, QoE, for a media stream, in accordance with examples of the disclosure. Process 100 begins at 102. At step 102, a first window of frames of the media stream is received. At step 104, a second window of frames of the media stream is received. The video quality variations can be split into long-term and short-term changes. Specifically, short-term changes refer to quality variations among neighboring segments, while long-term changes indicate the quality variations between temporal intervals. The impact of long-term changes may be captured by windowing operations. FIG. 4 shows the concept of a sliding window moving along the playout session. A non-overlapping moving window can be used to reduce complexity, also shown in FIG. 4.

At step 106, a plurality of metrics relating to the first and the second windows of frames are measured. At step 108, the plurality of metrics for each window of frames is aggregated. At step 110, a window quality of experience, QoE, value based on the aggregated plurality of metrics is determined.

In some examples, the metrics and references therein are reduced reference-based VQA for the QoE value calculation. In this way, a light weight computation can be made to extract neural features from decoded pictures and then compare them with the reference (or source). The reduced reference is a small, insignificant payload to be included in the video stream when compared to the original reference source frame, for any given frame. Furthermore, it describes the statistics of the uncompressed source video, which is more beneficial than solely relying on the received bitstream in a non-reference-based approach mode.

The reduced reference solution can be extended to include a frame difference so that it also provides the capability to capture temporal correlations among neighboring frames. This is useful when rebuffering or video stalling occurs at the client. Such temporal degradation may not be expected by the server when it selects and sends a stream of predicted bitrate. Degradation of temporal smoothness and motion naturalness in the source video needs to be captured at the playback, which is the final perception by the user, which is discussed in more detail with reference to FIGS. 6-7D. The inclusion of temporal information from consecutive frames can be in different forms, e.g., scene importance. In this disclosure, the reduced reference formulation is leveraged to create neural features of neighboring or nearby frames, known as windows. In this approach, there are also various options to create the references and carry the neural features in bitstreams, discussed below.

Option 1 is to send full-resolution source frames in a side-by-side manner as input to neural feature extraction. In the case of option 1, it is to capture the original resolution of the source video. When the payload is of concern, especially in the low bitrates of adaptive bitrate streaming, such references can be reduced to a carriage in every other frame, with appropriate signalling. Such a choice aligns with the intention to reduce the frequency of QoE computation in the case of battery-powered mobile devices.

Option 2 is to send reduced (e.g., half) resolution source frames in a side-by-side configuration as an input to neural feature extraction. Option 3 is to send reduced (e.g., half) resolution source frames in a top-and-bottom configuration as an input to neural feature extraction. Options 2 and 3 make a compromise of resolution so that it is only a marginal increase of the payload in transmitting the references, compared to sending a single frame reference. For general video content, loss of high frequencies in horizontal subsampling has been proven to be less impactful to the quality degradation perceived by the human visual system than in vertical subsampling. However, this down-sampling in the frame packing choice can be content-dependent. It is possible to detect high frequencies in both directions and determine what to better preserve. This choice can also be made per scene, segment, or variant of frames.

Options 1, 2, or 3 are selected so that, at the receiver, a similar down-sampling will be applied to the decoded frames before the feature extraction and comparison with the references. As shown in FIGS. 7A-7C, there is a next frame used in the comparison. The inclusion of a next frame in the comparison is to provide a means for comparing the frame difference. This can be used to assess the integrity of temporal smoothness. The neural features extracted from the source video represent a natural transition in neighboring frames. In the case of a quality switch by changing the bitrates, packet loss in a frame (e.g., partial decoding plus error concealment), or repeating a frame due to rebuffering, the temporal naturalness may be broken or degraded. The availability of such features will serve a better purpose for VQA in quantifying temporal quality. In addition, the access to a reduced reference of the next frame can be used to help measure the degradation due to video stalling. This will be described in more detail below, with regard to FIGS. 7A-7C.

Figure 2:
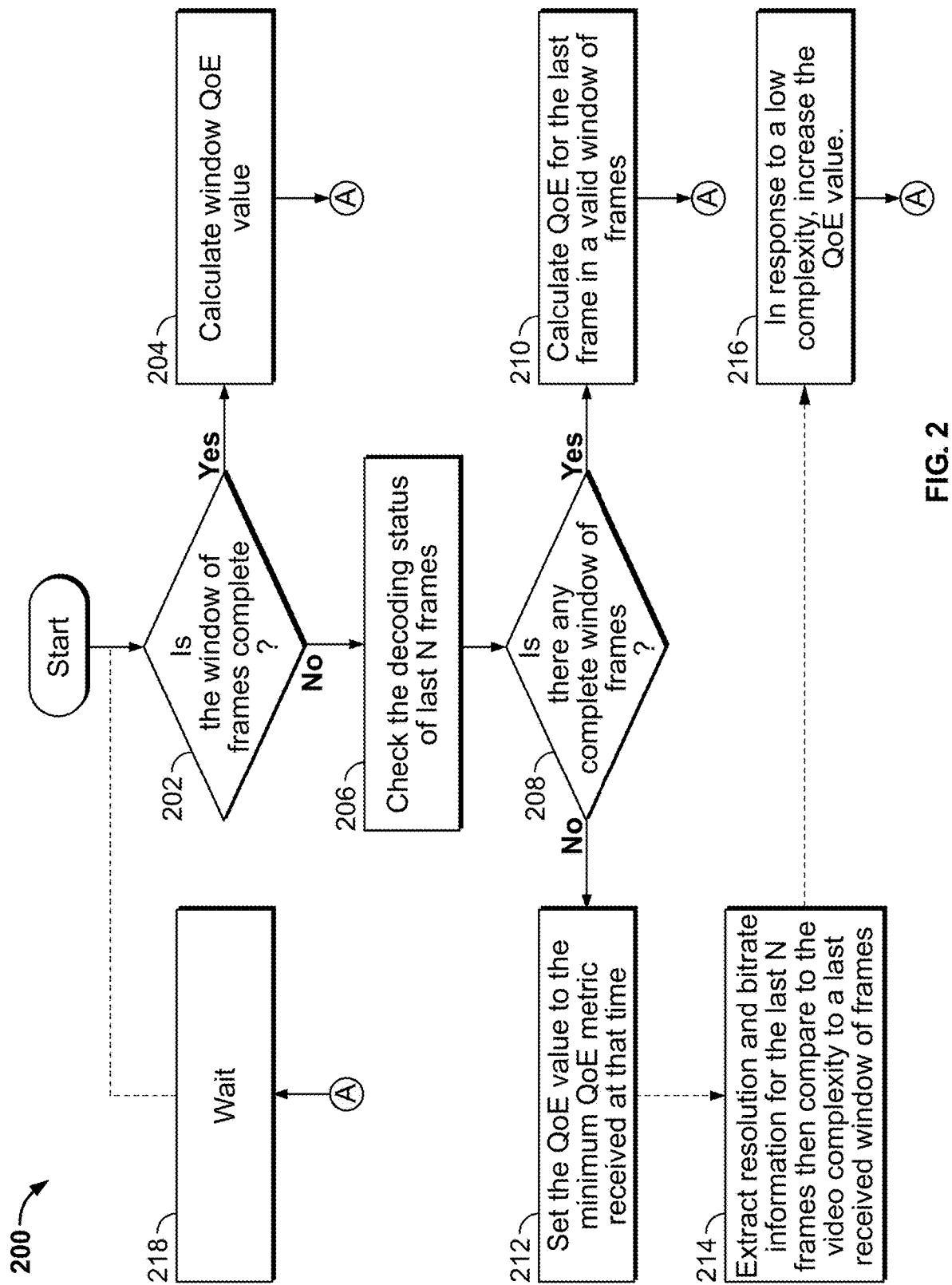
FIG. 2 illustrates an exemplary flowchart of the processing involved in the estimating of quality of experience based on window frame availability, in accordance with examples of the disclosure.

FIG. 2 illustrates an exemplary flowchart of the processing involved in the estimating of quality of experience values based on window frame availability, in accordance with examples of the disclosure. Process 200 may be incorporated into other processes herein, such as process 100. Alternatively, process 200 may be carried out in parallel to the processes herein, such as, again, process 100.

In the case of errors, e.g., due to packet loss, the selection of frames to compute the QoE value depends on a complete (or verified) receipt of reduced reference frames included in the video stream. Process 200 provides an approach to handling the case of an unverifiable reference. This gives a penalty to the situation of missing references over several continuous frames. When this occurs, it is indicative of losing frames in a row and the video playback would experience poor QoE over the target interval.

For example, process 200 may start after step 102 or 104 of process 100. Process 200 is shown to start at step 202. At step 202, it is determined if the window of frames is complete or not. This may be in reference to either the first window of frames or the second window of frames from process 100 shown in FIG. 1. If the answer to step 202 is yes, process 200 continues on to step 204. At step 204, the window QoE value is calculated. If the answer to step 202 is no, process 200 continues on to step 206. At step 206, the decoding status of the last N frames is checked.

At step 208, it is determined if there are any complete windows of frames or not. If the answer to step 208 is yes, process 200 continues on to step 210. At step 210, the QoE for the last frame in a valid window of frames is calculated. If the answer to step 208 is no, process 200 continues on to step 212. At step 212, the window QoE value is set to the minimum QoE metric received. For example, the minimum QoE metric may be the bitrate or may be the number of stall events, or the like, which corresponds to a minimum QoE value.

A more sophisticated measurement may consider the bitrate variation, assuming such information is readily extracted from the received stream segments, even when errors occur. The logic is shown in FIG. 2, as well. This option is to consider a scenario of stationary scenes where video frames may be better recovered than in high-motion scenes. In some examples, process 200 ends after step 212, however, in some other examples, process 200 optionally continues on to step 214. At step 214, the resolution and bitrate information for the last N frames are extracted and compared to the video complexity of the last received window of frames. In more detail, for a given resolution, R, and a given bitrate, B; when the resolution R and bitrate B information is correctly extracted for the last N frames, the video complexity, R*B, is compared against a well-received segment. In some examples, it is best practice to choose the last received window of frames as this is most likely the most relevant data. However, in some circumstances, the user may have changed from WiFi to mobile data, for example, so a more appropriate selection for the segment can be made, such as the last well-received mobile segment.

Optionally, process 200 continues on to step 216. At step 216, in response to a low complexity value, relative to the last well-received segment, the QoE value is increased. It should be noted that such an adjusted QoE value should not exceed the average of the minimum and mean values of the last window QoE value, which was calculated prior to the present calculation.

After steps 204, 210, and 216, process 200 may end, or progress to step 218, shown by reference "A" on FIG. 2. At step 218, process 200 initiates a waiting period before starting process 200 again.

Figure 3:
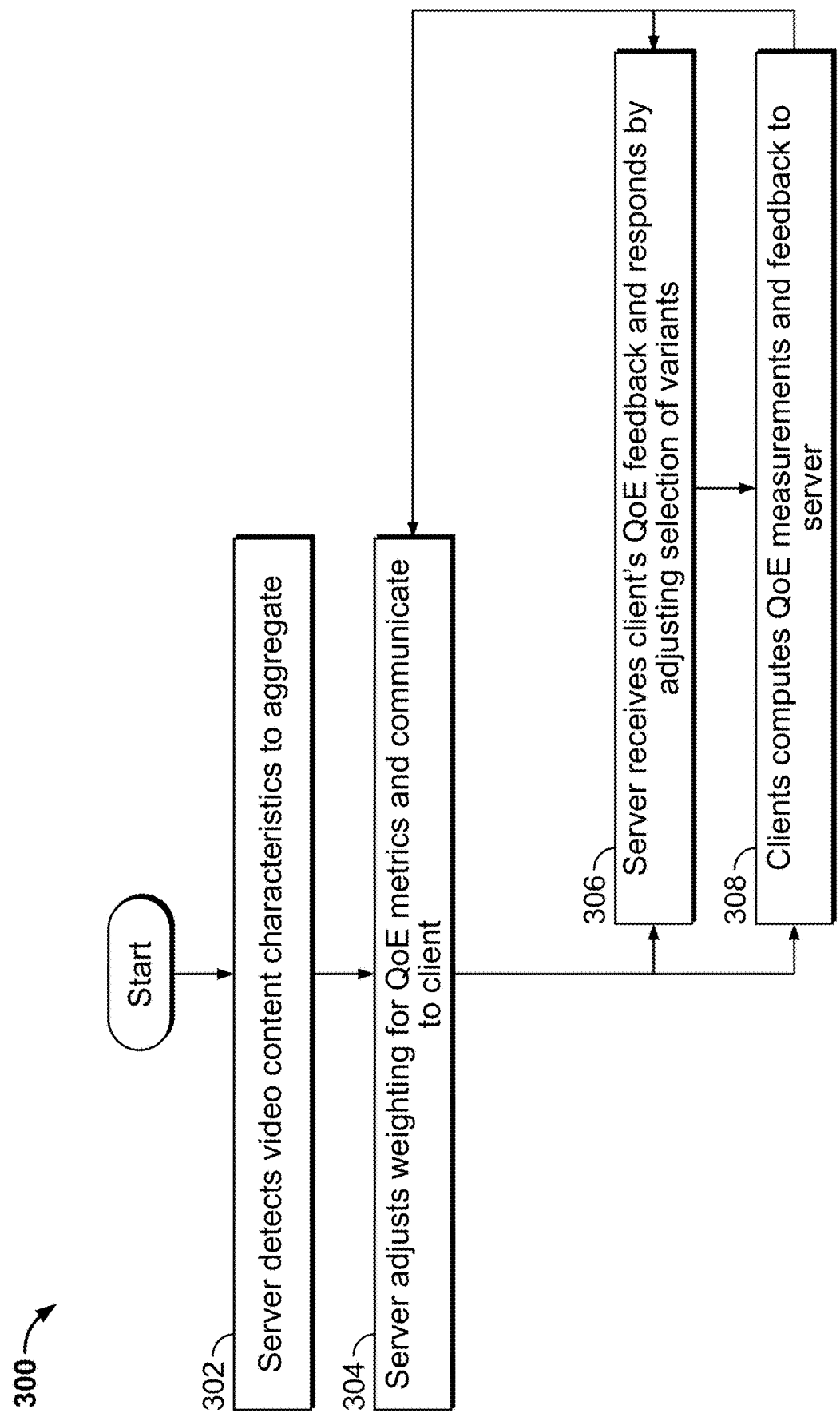
FIG. 3 illustrates an exemplary flowchart of the processing involved in the interactions between a server and a client device for feedback QoE measurements, in accordance with examples of the disclosure.

FIG. 3 illustrates an exemplary flowchart of the processing involved in a server in a streaming system, in particular the interactions between a server and a client device for feedback QoE measurements, in accordance with examples of the disclosure. Process 300 may be incorporated into other processes herein, such as process 100. Alternatively, process 300 may be carried out in parallel to the processes herein, such as, again, process 100 or even process 200.

When it occurs, rebuffering in non-live video streaming leads to pauses, e.g., repeating the last frame until decoding resumes. This usually does not cause a loss of video content. In live streaming, rebuffering may cause a loss of content. The impact can become more negative in some use cases than others. For instance, in live e-commerce, a missing 5-second segment may happen to inform important detail about a product. In the case of live sports streaming, a loss of 2 seconds may miss a critical scoring action in a game.

When in live streaming of sports events, the importance of continuous playback, presentation of scoring, etc. may overwhelm the video quality. This is largely due to the value of liveliness, differing from on-demand video streaming. Also, viewer engagement may significantly degrade in the presence of interruptive stalling, which potentially leads to a strong unwillingness to continue. In this case, measurements of QoE focused on stalking instances should be prioritized or weighted higher.

When streaming content with little or no motion, e.g., live e-commerce or promotional events would usually require different considerations. For example, a higher resolution may be more critical in presenting new products to an audience. It is not as exasperating when rebuffering happens, and as an option, cached advertisements can be inserted. In contract, for live sports streaming, such interruptive ads are highly undesirable.

In general, stationary and fast motion sequences demonstrate different perceived degradation in the case of bitrate changes and rebuffering. This indicates the need for adjusting the priorities and weights for various QoE metrics, in both the short-term and long-terms measurements.

Process 300 begins at step 302. At step 302, the server detects video content characteristics to aggregate. In some examples, the content characteristics may be annotated, e.g., the content type by streaming channel. At step 304, the server adjusts weightings for the QoE metrics and sends the weighted metrics to the client. The weights are based on both short-term and long-term measurements, in addition to requirements for sampling interval in QoE calculation, and the like.

At step 306, the server receives the client's QoE feedback and responds by adjusting the selection of variants or segments. At step 308, the client computes the QoE measurements and feedback to the server. Step 306 and step 308 are positive feedback loops, designate to constantly improve the QoE at the client device based on the window QoE value calculated and used in the aggregate. Quality variations at bitrate switching are discussed with reference to FIG. 6.

The detection of content type can be done through encoding production at the server, or the categorization is made available by the nature of content for a specific streaming channel. As shown in FIG. 3, the content type can be used to decide the initial settings of the server requesting measurements from a client. The settings can be optimized based on content type, such as the required intervals for calculating QoE, which may differ for stationary and fast-action content.

In some examples, the method may comprise any one or more of the following steps, in addition to, or in place of, some of the features as described above with reference to FIGS. 1-3: receiving a data flow between a source and a destination on a network; identifying a media stream within the data flow; detecting at least one event related to the media stream indicative of a quality of experience as perceived by a subscriber; measuring a plurality of metrics relating to the media stream based on the at least one detected event, the metrics being selected from the group consisting of playback stall duration; playback stall frequency; media streaming server start latency, bit rate transition frequency, and media restart; aggregating each of said metrics over a dimension of interest related to the network; normalizing each aggregated metric over a selected range based on a threshold value for each metric; and calculating a quality of experience value based on the normalized aggregated metrics.

FIG. 4 illustrates window-based frame analysis for QoE computations, in accordance with some examples of the disclosure. The impact of short-term changes within a window is represented by an existing QoE (or indeed a VQA). For this purpose, the measurement is called window quality of experience value. The cumulative QoE at any time point is computed based on window quality values, including the impacts of factors such as long-term changes and recency. Note that, in the first few time instances, when the video duration is less than e.g., 3 segments, the corresponding cumulative quality values are directly computed from the window quality model.

Note that the deployment of cumulative measurements, including the short and long terms, can leverage existing QoE metrics. Here, the reduced-reference model is used as an example, either by a sliding window or by a non-overlapping moving window.

Multiple key components of the cumulative quality model are included here. The statistics of mean, min and max represent considerable information about the long-term quality, at any window position. An operation of pooling can be devised to compute a weighted sum of those components at any moment.

For example, for any w-th window, the window quality of experience value, $VQA[w] \cdot curr$, may be calculated. Thereafter, the mean, minimum, and maximum values over the past w−1 windows can be calculated as follows:

$$VQA[w] \cdot \text{mean} = \frac{(VQA[w] \cdot curr + VQA[w-1] \cdot \text{mean} * (w-1))}{w}$$

$$VQA[w] \cdot \min = \min(VQA[w] \cdot curr, VQA[w-1] \cdot \min)$$

$$VQA[w] \cdot \max = \max(VQA[w] \cdot curr, VQA[w-1] \cdot \max)$$

Furthermore, the deviation for the w-th window can also be calculated as follows:

$$VQA[w] \cdot diff = VQA[w] \cdot curr - VQA[w] \cdot mean$$

Note that the values at the first window VQA[1]·curr and the last window VQA[w]·curr collected upon the w-th window are representations of primacy and recency VQA quality of experience window values. The cumulation may consider including a weighted (by differentiated importance) contribution of these initial and least quality values. The difference VQA[w]·diff is zero-centered and shows the variation in VQA of the current window from the cumulative mean VQA.

Figure 5:
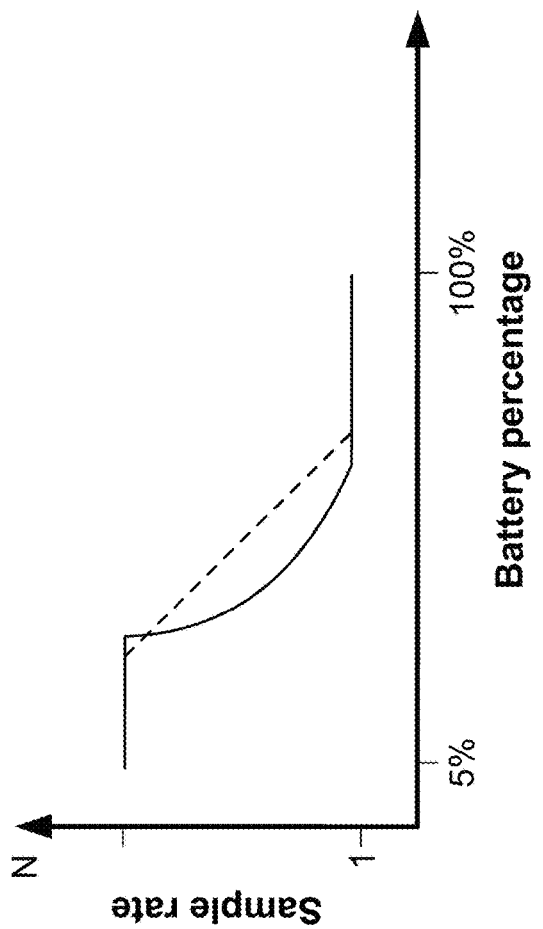
FIG. 5 illustrates selective VQA computation complexity based on battery percentage, in accordance with some examples of the disclosure.

FIG. 5 illustrates selective VQA computation complexity based on battery percentage, in accordance with some examples of the disclosure.

In mobile video streaming, it is practically undesirable to compute VQA on a frame-by-frame basis on the end devices, which are battery-powered. Calculation of VQA every N (N>1) frames within each window will provide a measurement of perceptual quality, while it reduces the complexity of computation and saves power. Note that this may rely on existing spatial VQA or frame-based quality.

The choice of selected intervals to compute the VQA can be made adaptive and dynamic. The battery level percentage at a given time on a mobile device may be used to decide the interval. Different functions can be used in this adaptation. FIG. 5 shows some example curves for such modulations.

FIG. 6 illustrates variable bitrates and stalling in a 60-second stream, in accordance with some examples of the disclosure. As discussed earlier, it is important to evaluate the impact on video quality when rebuffering or stalling occurs. For example, a video stream typically contains highly diverse spatial and temporal complexities. Different video clips may be retained differently in a viewer's memory. Those both interact with memories of degraded QoE caused by e.g., rebuffering events or bitrate drops.

VQA of each bitrate is also available at encoding production, or by a streaming server that selects and sends a particular bitrate. However, it is challenging to understand the eventual QoE at the client due to various reasons such as rebuffering and bitrate variation, etc. An example playout session is shown in FIG. 6 to illustrate the variations of quality over time and possible video stalling due to rebuffering.

In another scenario, the degradation due to packet loss is not easily assessed against picture quality. Parametric modeling may collect network detail and predict the degradation or impairment, without comparing video quality after e.g., error concealment. Such a negative impact to picture quality may propagate due to the nature of inter-frame compensation in video compression. The temporal aspect of quality fluctuation is also critical in the development towards optimizing QoE. It is highly desirable to quickly and accurately predict the instantaneous objective QoE by, for example, calculating a window QoE value score. It can then supply crucial feedback to adaptive bitrate streaming algorithms on either the client or the server side.

FIGS. 7A-7D illustrate the measurement of video quality variations at bitrate changes and comparisons, in accordance with some examples of the disclosure. In FIG. 7A, Diff_ref_t+1 and Diff_ref_t+2 capture the temporal difference in the source video. Diff_dec_t+1 and Diff_dec_t+2 represent the temporal difference in the video that an end user perceives. At a switch of bitrates, the comparisons of such variables provide a quantitative metric for temporal quality variations. For instance, the difference between Diff_dec_t+1 and Diff_dec_t+2 is indicative of a drop or rise of picture quality, while the difference between Diff_ref_t+1 and Diff_ref_t+2 remains consistently small. This may become more apparent in the case of stationary video.

FIG. 7D in particular is an illustration of the impact of stalling to the perceived video quality through the analysis of subjective evaluation results of a video database. It is consistent that stalling video would cause significant degradation in QoE. When the number of stalls increases, user annoyance increases monotonically, irrespective of the video content or duration.

The degradation of QoE due to rebuffering is usually calculated with the number of stalls, lengths of stalls, time since the last stall, frequency of stalls, rebuffering rate, etc. Such solutions were usually designed by collecting a few variables, formulating a model (traditional or NN based), and training the model with the use of an established video database. The database includes emulation of the effects from rebuffering, bitrate changes, etc. to include degradation of temporal quality. VQA value measurements calculated on a frame-by-frame basis provide limited efficiency in capturing the temporal variation. In an extreme case, freezing an intra-coded frame may show good spatial quality, even though it does not exhibit any temporal naturalness as seen in the source video. The inclusion of neighboring frames in a form of reduced reference as described previously provides a solution to distinguish such impairment to some extent.

In the case of packet loss to cause one frame to be corrupted, errors after recovery are likely to propagate in the inter-prediction in decoding the following frames. When the bitstream of the following frames is without any errors and completely decoded, visual anomalies occur. However, without a reference or extracted feature of the source video, it is impossible to quantify such QoE degradation. The value of reduced reference of multi frames not only provides a way to quantify the spatial quality of each frame but also improves the efficiency in assessing temporal quality. This makes it valuable in generating more accurate client-driven video QoE.

FIG. 7B shows the possibility of capturing the difference in temporal naturalness, i.e., VQA_t differs from VQA_t+1. Without the availability of reference frame t+1, both VQA_t and VQA_t+1 would be the same, i.e., representing the difference of frame t. In addition to measuring the quality difference between the source and decoded frames at frame t and frame t+1, the reduced references can be used to derive the cumulative effect of temporal naturalness. In the case of video stalling, Diff_dec_t+1 in FIG. 7C is zero because the frame is repeated at the pause of playback. However, Diff_ref_t+1 is a meaningful representation of the difference in the source video. This is not possible if the reduced reference of frame t+1 is not accessible before the stalling occurs. Throughout stalling, the values of Diff_ref_t+1 can be accumulated to indicate the continuing degradation.

The comparison of temporal quality variation can be readily extended to consider the variation that exists in the past frames within a longer interval, not limited to the immediately neighboring frames.

FIG. 8 illustrates an exemplary simplified pseudo-code for an adaptive bitrate manifest, in accordance with some examples of the disclosure. FIG. 8 is considered to be the exemplary implementation of a general manifest for adaptive bitrate technologies and is non-limited in its specific structure and syntax. The manifest 800 is a container file for chunks of data that provide a user OTT service/platform with the information required for displaying content to a user during a loading event, in particular, but not limited to, after the user launches a platform/application to request a video or audio resource (e.g., a TV show, movie, series, a user created content or the like). Manifest 800 and manifest 900 of FIG. 9 discuss optional QoE tags, which are an additional implementation that can provide context to a user device of a user preference for improved QoE.

As shown in FIG. 8, manifest 800 starts with a header 802 and then contains a series of data blocks. In some examples, the header of the manifest identifies the format that the manifest is in (e.g., HTML, XML, or the like) and/or what adaptive bitrate technology the manifest relates to (e.g., DASH, HLS, or the like). In some examples, the header can be omitted from being present within manifest 800 because the format of manifest 800 can be indicated by the filename extension suffix (e.g., ".xml," ".m3u8," ".txt," or the like), or a footer 850.

In some examples, the data blocks of a manifest may comprise a block indicating a base URL 804, first contextual information 810, a first segment list 820, second contextual information 830, a second segment list 840, comprising first and second segment URLs 842 and 844, a footer 850. Other examples of data blocks include media type, representation blocks, ID tags, file names, initialization sources, subtitles, and fallback sources (e.g., failover URLs).

In some examples, a data block may be a base URL 804 for signaling the base URL that all resources to follow will be obtained from. For example, the base URL is the first part of a website URL such as "http://video.platform.com/v1." It is this base URL that later described segment URLs will be concatenated onto. Like any of the data blocks, the Base URL 804 may comprise any text or character with an equivalent Unicode Code Point. In some examples, Base URL 804 may be unique to the whole manifest that all subsequent URLs, such as Segment URLs, are concatenated onto.

In some examples, a data block may be a segment list. In some examples, the Segment list may further comprise a segment reference, for example, a range of frames to obtain (e.g., range="0-862"), a start and end time to obtain (e.g., 1253 s to 1258 s), or a segment reference ID (e.g., "segment 12"). In some examples, the segment list further comprises a bitrate variant reference ID or tag. In some examples, the segment list with a range of frames to obtain is referred to as a media range. In some examples, there may be a minimum duration that the segment list indicates. For example, a minimum duration of 4 seconds to obtain as a segment, although any period may be chosen as a minimum duration.

In some examples, a data block may be a segment URL. As mentioned briefly above, a segment URL is a suffix to be added to the base URL by the user content player to complete the URL to a particular segment. In other words, the base URL and segment URL together make the complete URL to any particular media content item contained within the manifest. In some examples, the whole URL per segment or bitrate variant is displayed in the segment list; however, this is often unnecessary as clogs up the manifest with a lot of repetitive data. In the concatenating examples, the overall manifest file size is kept to a minimum, reducing unnecessary overheads in the manifest file.

The manifest 800 may further comprise a data block that represents contextual information 810. In some examples, the context 810 is used to provide context to any one or more of the header 802, the base URL 804, the first contextual information 810, the first segment list 820, the second contextual information 830, the second segment list 840, comprising first and second segment URLs 842 and 844, a footer 850. The contextual information may be a contextual tag that the logic of an OTT service/platform can interpret. The contextual information may represent language, subject matter, and segment metadata. Segment metadata includes, for example, codecs, audio tags, video tags, version numbers, encoding information, bandwidth markers, resolution or size of media content, or file names. In some examples, the context tag is configurable by the user or is configured by a user profile of the user, which can be obtained by control circuitry. For example, a user profile linked to the user content player may configure the context tag to always select the OTT service recommended media content item or a media content item that is most relevant to the content the user watched last.

In some examples, the data blocks as described above further comprise meta-data. In some examples, contextual information blocks may further comprise rules on what media content items to fetch. The start time, end time, and segment reference as discussed with reference to the segment list are considered an example of meta-data of the segment list data block, for example. One example of meta-data is the type of content to fetch to be advertised to the user when experiencing a loading event.

Subtitles are also considered to be meta-data of the manifest 800, subtitles are often provided in a format known as Web Video Text Tracks (WebVTT), which is a World Wide Web Consortium (W3C) standard for displaying timed text in connection with the HTML5 <track> element. Other common caption formats include XML-based Timed Text Markup Language (TTML) and the "SubRip" file format. The timed text refers to the presentation of text media in synchrony with other media, such as audio and video. Therefore, all timed text formats should be considered as falling within the scope of the methods and examples herein. While different timed text formats are compatible across a number of different devices and browsers due to their slight differences, all these formats contain text information to be displayed alongside a media asset such as audio, video, or a combination of both.

Any data blocks which are not understood by legacy media asset players, due to the fact they have not been updated to read such data blocks, would be ignored. Therefore, in some examples, the manifest 800 is backwards compatible with legacy user content players. Data blocks may be separated by lines, commas, semi-colons, special characters, or any other common choices of the syntax used in computing languages such as C++, C #, Python, R, Java, JavaScript, HTML, and the like.

The manifest 800 is a container file, usually comprising lines of instructions to be carried out by a user device, application, or OTT service provider. The manifest 800 may be generated by an OTT service provider in response to the launching of a service, application or platform on a user device. In particular, manifest 800 starts with a header 802 comprising lines 0 and 1 of the pseudo-code. In this example, the header informs the user device of the version and encoding formats of the manifest 800 and includes some reference sources for information. The user device may be a web browser, media player, application on a smartphone, smart TV, or another device.

The manifest 800 comprises a base URL 804 in line 2. The base URL 804 is "http://video.platform.com/v1" and is shown between two tags, indicating the base URL 804 to the user's device.

Lines 4 and 10 comprise first and second contextual information 810 and 830. The first contextual information 810, shown on line 4 of FIG. 8, comprises a contextual tag that indicates the following lines comprise information relating to English audio. The second contextual information 830, shown on line 10, comprises a contextual tag that indicates the following lines comprise information relating to the video. The user device can therefore identify the lines following the first and second contextual information 810 and 830 as such.

Manifest 800 comprises a first segment list 820. First segment list 820 follows the first contextual information 810 on line 4, therefore the user content player will understand that the first segment list 820 is a segment list for audio, in particular, lines 5 to 9 of manifest 800 provide the information required for the user device to obtain the audio contained within the base URL 804. In some examples, the user device concatenates the base URL 804 with the segment URL found within the first and second segment lists 820 and 840 to obtain the full URL where the media content item can be found.

Manifest 800 comprises a second segment list 840, comprising first and second segment URLs 842 and 844. The media content item that manifests 800 comprises the URLs for the user content player to obtain and comprises multiple bitrate variants. In particular, a bitrate variant is contained within the first segment URL 842 requiring a bandwidth of 1 Mbit/s (megabits per second) that has a resolution of 2160×1440 pixels per square inch, as shown in FIG. 8 in the metadata of lines 11 to 14. A second bitrate variant is contained within the second segment URL 842 requiring a bandwidth minimum of 2 Mbit/s that has a resolution of 3840×2160 pixels per square inch as shown in FIG. 8 in the metadata of lines 15 to 17. The first and second segment URLs 842 and 844 points to a video titled "BigNewMovie" encoded with advanced video coding (AVC) also referred to as H.264 or MPEG-4 Part 10, Advanced Video Coding (MPEG-4 AVC), this may be a trailer for a new movie that the OTT content platform wants to push to the user.

Manifest 800 comprises a footer 850. The footer indicates the end of the manifest 800 and often comprises contextual information such as file extension suffixes (e.g., ".xml," ".m3u8," ".txt," or the like). Further information may also be included in the manifest 800 files such as initialization sources, subtitles, and fallback sources (e.g., failover URLs).

Lines 4, 12, and 15 of manifest 800 also comprise Quality of Experience tag information. The QoE tag further comprises an indication of the priority of that section of manifest 800. In some examples, the priority or a user profile of the user configures the priority. For example, a user profile linked to the user device may configure the context tag to always select the highest priority recommendation data or video content items in the lowest resolution available based on the available bandwidth, but always ensure that video is selected and not audio only (as shown by low priority tag on line). Accordingly, manifest 800 shows that the QoE tag information on lines 4, 12, and 15 further includes an indication of priority based on the user's preferences. In this way, the user can pre-indicate how they would prefer their experience of the bitrate stream.

The QoE information in manifest 800 is shown as a QoE tag, shown as QOETAG="X" Priority="Y", where X is a numerical value and Y is high, medium, or low. It should be understood that this example is intended to be non-limiting and numerous other examples of indicating the tag are possible, or indeed this may not be present in manifest 800, in accordance with the examples discussed above. In some examples, the user device will search through the manifest 800 to find parts of the manifest 800 of interest indicated by the presence of contextual tags, QoE tags, and/or contextual information 810. More information on QoE tags is provided below with regard to a further example with reference to FIG. 9.

FIG. 9 illustrates exemplary pseudo-code for flagging a window for a QoE analysis and priority of media content items in a manifest, in accordance with some examples of the disclosure. In particular, FIG. 9 shows part of a manifest 900 comprising a first segment list 910 and a second segment list 920. The first and second segment lists 910 and 920 of manifest 900 are different examples of the first and second segment lists 820 and 840 of manifest 800, as described with reference to FIG. 8 above. In particular, FIG. 9 illustrates a different way of implementing the QoE tag in manifest 900 compared to FIG. 8. For example, and as will be discussed in more detail below, FIG. 9 illustrates tagging each segment URL, i.e., a window of frames, within the manifest 900 with an indication of QoE tag priority such that user QoE preferences can be made.

In FIG. 9, the indication of QoE tag priority is shown for each segment within the first and second segment lists 910 and 920. For example, QOETAG "L" is shown on line 3, to indicate that the segment contained within the associated segment URL has a priority that is low relative to the other segments in the segment list 910. Accordingly, this segment may be displayed last. Each of the segment URLs on lines 3 to 5 and 10 to 12 is shown with an indication of bid tag priority with a relative value of L, M, or H. In this way, the user device has an indication of the priority of segments for QoE based on user preferences for each media content item (i.e., segment) of a plurality of media content items and allows greater granularity when determining a subset of the URLs to retrieve to display on a user device during a loading event, based on user preferences, recommendation data, and, in some examples, the available bandwidth of the user device. Another OTT service may, in real-time during a loading event, push to the user device to improve their QoE by highlighting various segments of an adaptive video stream to be higher bitrate for an improved QoE to a user.

While FIG. 9 describes how a window of frames may be flagged for a QoE analysis, it should also be understood that QoE analysis is preferably carried out at the client device, whether flagged by the server for the analysis, or whether the decision to carry out the QoE analysis is made at the client device by, for example, a QoE module. Accordingly, FIG. 10 illustrates an exemplary media transmission device 1000, in accordance with some examples of the disclosure. The media transmission device 1000 comprises a transceiver module 1010 and a control module 1020, and, optionally, a display device 1030. The media transmission system may communicate with an additional user device 1035, such as a home game way, smartphone, or other smart devices. The transceiver module 1010 is configured to receive recommendation data from a recommendation engine and download first media content item based on the recommendation data.

In some examples, the transceiver module communicates with a second user device 1035 via communication link 1018. The communication link 1018 between the transceiver module 1010 and the second user device 1035 may comprise a physical connection, facilitated by an input port such as a 3.5 mm jack, RCA jack, USB port, ethernet port, or any other suitable connection for communicating over a wired connection or may comprise a wireless connection via BLUETOOTH, Wi-Fi, WiMAX, Zigbee, GSM, UTMS, CDMA, TDMA, 3G, 4G, 4G LTE, 5G or other wireless transmissions as described by the relevant 802.11 wireless communication protocols.

In some examples, the display device 1030 is coupled to the transceiver module and control module. The display device 1030 is configured to display media content items. In some examples, the control module 1020 is coupled to the transceiver module 1010 and the display device 1030. The control module 1020 may comprise a QoE analysis module (not shown). The control module 1020 is configured to receive a first window of frames and a second window of frames of a media stream. The control module can then measure a plurality of metrics relating to the first and the second windows of frames, aggregate the plurality of metrics for each window of frames; and determine a window QoE value based on the aggregated plurality of metrics. In this way, the configuration and execution of the QoE is carried out by the client device.

In some examples, the communication link 1018 is between the media transmission device 1000 and a home gateway device (such as a user device), which is in turn in communication with the second user device 1035. These examples are considered to be non-limiting and other combinations of the features herein being spread over two or more devices are considered within the scope of this invention. For example, each of the transceiver modules, the display device, and the control module may be separate internet of things (IoT) or edge (i.e., smartphones and tablets) devices.

Figure 11:
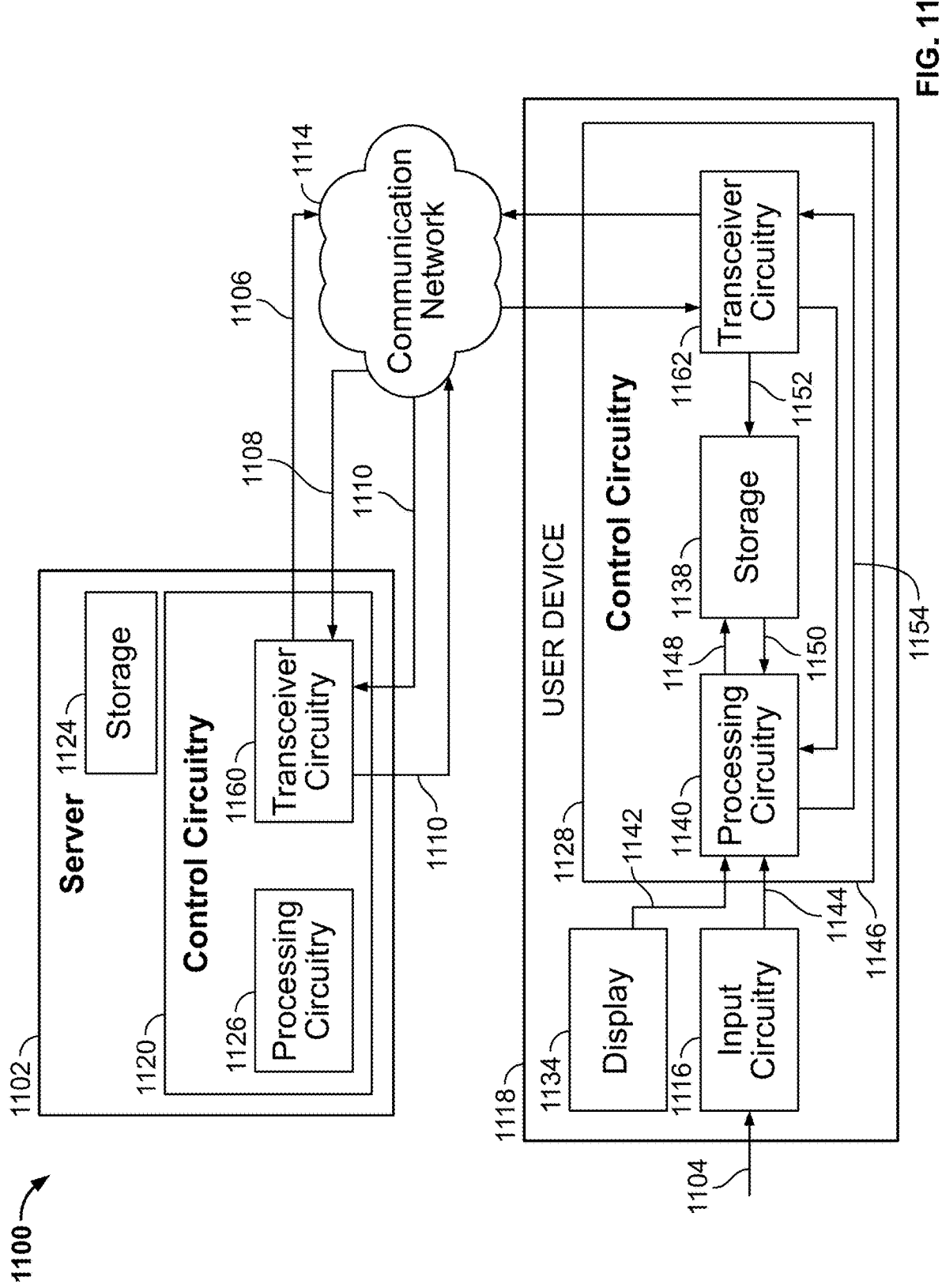
FIG. 11 is a block diagram representing devices, components of each device, and data flow therebetween for an adaptive video streaming system, in accordance with some examples of the disclosure.

FIG. 11 is a block diagram representing devices, components of each device, and data flow therebetween for an adaptive video streaming system, in accordance with some examples of the disclosure. System 1100 is shown to include a client device 1118, a server 1102, and a communication network 1114. It is understood that while a single instance of a component may be shown and described relative to FIG. 11, additional instances of the component may be employed. For example, server 1102 may include or may be incorporated in, more than one server. Similarly, communication network 1114 may include or may be incorporated in, more than one communication network. Server 1102 is shown communicatively coupled to client device 1118 through communication network 1114. While not shown in FIG. 11, server 1102 may be directly communicatively coupled to client device 1118, for example, in a system absent or bypassing communication network 1114.

In some examples, the media content items are retrieved as an adaptive bitrate stream compatible with the MPEG-DASH standard, or other implementations such as Apple HLS. In some examples, the downloading of media content items are encoded at a first maximum bitrate and/or the first resolution. For example, the request may be a request for the next segment of an adaptive bitrate stream, and therefore the first media content item may be requested at a first maximum bitrate (or resolution) based on the first network bandwidth at the time of the request. In some examples, the second media content item content is encoded at a second maximum bitrate and/or a second resolution, such that content is always available, and content at a variety of resolutions and bitrate are requested from a serve 1102. The second media content item may be a higher bitrate version of the first content item, or vice versa, such as an interactive poster or a short video clip. In some examples, the media content is encoded using an adaptive bitrate streaming compatible codec. There are numerous examples of video codecs that are adaptive bitrate streaming compatible (e.g., x264, OpenH264, H.264/MPEG-4 AVC, which are all codecs compatible with the video format H.264). Moreover, there are numerous examples of video formats (e.g., H.264, H.265, VP9, AV1), each of which has numerous examples of video codecs.

Communication network 1114 may comprise one or more network systems, such as, without limitation, an internet, LAN, WIFI, or other network systems suitable for audio processing applications. In some examples, system 1100 excludes server 1102, and functionality that would otherwise be implemented by server 1102 is instead implemented by other components of system 1100, such as one or more components of communication network 1114. In still other examples, server 1102 works in conjunction with one or more components of communication network 1114 to implement certain functionality described herein in a distributed or cooperative manner. Similarly, in some examples, system 1100 excludes client device 1118, and functionality that would otherwise be implemented by the client device 1118 is instead implemented by other components of system 1100, such as one or more components of communication network 1114 or server 1102 or a combination. In still other examples, the client device 1118 works in conjunction with one or more components of communication network 1114 or server 1102 to implement certain functionality described herein in a distributed or cooperative manner.

The client device 1118 includes control circuitry 1128, display 1134, and input-output circuitry 1116. Control circuitry 1128 in turn includes transceiver circuitry 1162, storage 1138, and processing circuitry 1140. In some examples, client device 1118 or control circuitry 1128 may be configured as client device 1030 of FIG. 10.

Server 1102 includes control circuitry 1120 and storage 1124. Each of the storages 1124 and 1138 may be an electronic storage device. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVRs, sometimes called personal video recorders, or PVRs), solid-state devices, quantum storage devices, gaming consoles, gaming media, or any other suitable fixed or removable storage devices, and/or any combination of the same. Each storage 1124, 1138 may be used to store various types of content, media data, and or other types of data (e.g., they can be used to store multimedia content such as audio, video, and advertisement data). The non-volatile memory may also be used (e.g., to launch a boot-up routine and other instructions). Cloud-based storage may be used to supplement storages 1124, 1138 or instead of storages 1124, 1138. In some examples, the media content items, in accordance with the present disclosure, may be stored on one or more of storages 1124, 1138.

In some examples, control circuitry 1120 and/or 1128 executes instructions for an application stored on the memory (e.g., storage 1124 and/or storage 1138). Specifically, control circuitry 1120 and/or 1128 may be instructed by the application to perform the functions discussed herein. In some implementations, any action performed by control circuitry 1120 and/or 1128 may be based on instructions received from the application. For example, the application may be implemented as software or a set of executable instructions that may be stored on storage 1124 and/or 1138 and executed by control circuitry 1120 and/or 1128. In some examples, the application may be a client/server application where only a client application resides on client device 1118, and a server application resides on server 1102.

The application may be implemented using any suitable architecture. For example, it may be a stand-alone application wholly implemented on client device 1118. In such an approach, instructions for the application are stored locally (e.g., in storage 1138), and data for use by the application is downloaded periodically (e.g., from an out-of-band feed, from an internet resource, or using another suitable approach). Control circuitry 1128 may retrieve instructions for the application from storage 1138 and process the instructions to perform the functionality described herein. Based on the processed instructions, control circuitry 1128 may determine a type of action to perform in response to input received from the input/output path (or input-output circuitry) 1116 or the communication network 1114. For example, in response to a network bandwidth maximum, control circuitry 1128 may perform the steps of processes relative to various examples discussed herein.

In client/server-based examples, control circuitry 1128 may include communication circuitry suitable for communicating with an application server (e.g., server 1102) or other networks or servers. The instructions for carrying out the functionality described herein may be stored on the application server. Communication circuitry may include a cable modem, an Ethernet card, a wireless modem for communication with other equipment, or any other suitable communication circuitry. Such communication may involve the internet or any other suitable communication networks or paths (e.g., communication network 1114). In another example of a client/server-based application, control circuitry 1128 runs a web browser that interprets web pages provided by a remote server (e.g., server 1102). For example, the remote server may store the instructions for the application in a storage device. The remote server may process the stored instructions using circuitry (e.g., control circuitry 1128) and/or generate displays. Client device 1118 may receive the displays generated by the remote server and may display the content of the displays locally via display 1134. This way, the processing of the instructions is performed remotely (e.g., by server 1102) while the resulting displays, such as the display windows described elsewhere herein, are provided locally on the client device 1118. Client device 1118 may receive inputs from the user via input circuitry 1116 and transmit those inputs to the remote server for processing and generating the corresponding displays. Alternatively, client device 1118 may receive inputs from the user via input circuitry 1116 and process and display the received inputs locally, by control circuitry 1128 and display 1134, respectively.

Server 1102 and client device 1118 may transmit and receive content and data such as media content via communication network 1114. For example, server 1102 may be a media content provider, and client device 1118 may be a smart television configured to download or stream media content, such as a YouTube video, from server 1102. Control circuitry 1120, 1128 may send and receive commands, requests, and other suitable data through communication network 1114 using transceiver circuitry 1160, 1162, respectively. Control circuitry 1120, 1128 may communicate directly with each other using transceiver circuitry 1160, 1162, respectively, avoiding communication network 1114.

It is understood that client device 1118 is not limited to the examples and methods shown and described herein. In non-limiting examples, the client device 1118 may be a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a handheld computer, a stationary telephone, a personal digital assistant (PDA), a mobile telephone, a portable video player, a portable music player, a portable gaming machine, a smartphone, or any other device, client equipment, or wireless device, and/or combination of the same capable of suitably displaying and manipulating media content.

Control circuitry 1120 and/or 1118 may be based on any suitable processing circuitry such as processing circuitry 1126 and/or 1140, respectively. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores). In some examples, processing circuitry may be distributed across multiple separate processors, for example, multiple of the same type of processors (e.g., two Intel Core i9 processors) or multiple different processors (e.g., an Intel Core i7 processor and an Intel Core i9 processor).

Client device 1118 receives a user input 1104 at input circuitry 1116. For example, client device 1118 may receive a user input like a user swipe or user touch, as previously discussed. In some examples, client device 1118 is a media device (or player), with the capability to access media content. It is understood that client device 1118 is not limited to the examples and methods shown and described herein. In non-limiting examples, the client device 1118 may be a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a handheld computer, a stationary telephone, a personal digital assistant (PDA), a mobile telephone, a portable video player, a portable music player, a portable gaming machine, a smartphone, or any other television equipment, computing equipment, or wireless device, and/or combination of the same.

User input 1104 may be received from a user selection-capturing interface that is separate from device 1118, such as a remote-control device, trackpad, or any other suitable user movement sensitive or capture devices, or as part of device 1118, such as a touchscreen of display 1134. Transmission of user input 1104 to client device 1118 may be accomplished using a wired connection, such as an audio cable, USB cable, ethernet cable, or the like attached to a corresponding input port at a local device, or may be accomplished using a wireless connection, such as BLUETOOTH, Wi-Fi, WiMAX, ZIGBEE, GSM, UTMS, CDMA, TDMA, 3G, 4G, 4G LTE, or any other suitable wireless transmission protocol. Input circuitry 1116 may comprise a physical input port such as a 3.5 mm audio jack, RCA audio jack, USB port, ethernet port, or any other suitable connection for receiving audio over a wired connection, or may comprise a wireless receiver configured to receive data via BLUETOOTH, Wi- Fi, WiMAX, ZIGBEE, GSM, UTMS, CDMA, TDMA, 3G, 4G, 4G LTE, or other wireless transmission protocols.

Processing circuitry 1140 may receive input 1104 from input circuit 1116. Processing circuitry 1140 may convert or translate the received user input 1104 that may be in the form of gestures or movement to digital signals. In some examples, input circuit 1116 performs the translation to digital signals. In some examples, processing circuitry 1140 (or processing circuitry 1126, as the case may be) carries out disclosed processes and methods.

The term "OTT service" or "OTT platform" may refer to any platform, application, or media service or application provider that provides such services to a user or a user device.

The systems and processes discussed above are intended to be illustrative and not limiting. One skilled in the art would appreciate that the actions of the processes discussed herein may be omitted, modified, combined, and/or rearranged, and any additional actions may be performed without departing from the scope of the invention. More generally, the above disclosure is meant to be exemplary and not limiting. Only the claims that follow are meant to set bounds as to what the present disclosure includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real-time. It should also be noted that the systems and/or methods described above may be applied to, or used in accordance with, other systems and/or methods. In this specification, the following terms may be understood given the below explanations:

All of the features disclosed in this specification (including any accompanying claims, abstract, and drawings), and/or all of the steps of any method or process so disclosed, may be combined in any combination, except combinations where at least some of such features and/or steps are mutually exclusive.

Each feature disclosed in this specification (including any accompanying claims, abstract, and drawings), may be replaced by alternative features serving the same, equivalent or similar purpose unless expressly stated otherwise. Thus, unless expressly stated otherwise, each feature disclosed is one example only of a generic series of equivalent or similar features.

The invention is not restricted to the details of any foregoing examples. The invention extends to any novel one, or any novel combination, of the features disclosed in this specification (including any accompanying claims, abstract, and drawings), or to any novel one, or any novel combination, of the steps of any method or process so disclosed. The claims should not be construed to cover merely the foregoing examples, but also any examples which fall within the scope of the claims.

Throughout the description and claims of this specification, the words "comprise" and "contain" and variations of them mean "including but not limited to", and they are not intended to (and do not) exclude other moieties, additives, components, integers or steps. Throughout the description and claims of this specification, the singular encompasses the plural unless the context otherwise requires it. In particular, where the indefinite article is used, the specification is to be understood as contemplating plurality as well as singularity, unless the context requires otherwise.

All of the features disclosed in this specification (including any accompanying claims, abstract, and drawings), and/or all of the steps of any method or process so disclosed, may be combined in any combination, except combinations where at least some of such features and/or steps are mutually exclusive. The invention is not restricted to the details of any foregoing examples. The invention extends to any novel one, or any novel combination, of the features disclosed in this specification (including any accompanying claims, abstract, and drawings), or to any novel one, or any novel combination, of the steps of any method or process so disclosed.

The reader's attention is directed to all papers and documents which are filed concurrently with or previous to this specification in connection with this application and which are open to public inspection with this specification, and the contents of all such papers and documents are incorporated herein by reference.

What is claimed is:

1. A method for estimating quality of experience, QoE, for a media stream, the method comprising:
   receiving a trigger in the media stream;
   creating a first window of frames in response to receiving the trigger;
   receiving the first window of frames of the media stream;
   determining that the media stream is being played on a portable device;
   determining a battery charge percentage of the portable device;
   increasing a time offset between the first window of frames and a second window of frames based on an inverse proportionality to the battery charge percentage of the portable device;
   receiving the second window of frames of the media stream after the increased time offset;
   measuring a plurality of metrics relating to the first and the second windows of frames;
   aggregating the plurality of metrics for each window of frames;
   determining a window quality of experience value based on the aggregated plurality of metrics; and
   taking corrective action on the media stream based on the quality of experience value, wherein the corrective action is selected to change a streaming parameter of a server that provides the media stream.

2. The method of claim 1, wherein the trigger is associated with a point of interest in the media stream, the point of interest being one of: scene complexity, genre, bitrate data, segment complexity, scene content, or historical data.

3. The method of claim 1, wherein aggregating plurality of metrics further comprises weighting each metric based on a configurable importance.

4. The method of claim 1, wherein the window quality value is a zero-centered value that shows the variation of quality of experience over time between the first window of frames and the second window of frames.

5. The method of claim 1, wherein the first and the second windows of frames are reference frames that comprise reduced data density relative to corresponding frames in the media stream.

6. The method of claim 1, wherein the first and the second windows of frames comprise consecutive frames.

7. The method of claim 1, wherein the first and the second windows of frames overlap.

8. The method of claim 1, wherein the first and the second windows of frames do not overlap.

9. The method of claim 1, wherein the second window of frames are following the frames of the first window.

10. The method of claim 1, wherein the method is carried out in parallel to a user consuming the media stream on a user device.

11. The method of claim 1, wherein the media stream is a progressive media stream, and the measured plurality of metrics are associated with progressive media streaming.

12. The method of claim 1, wherein the media stream is an adaptive media stream, and the measured plurality of metrics are associated with adaptive media streaming.

13. The method of claim 1, wherein the corrective action includes increasing at least one of a bitrate of the media stream or a resolution of the media stream.

14. An apparatus for estimating quality of experience, QoE, for a media stream, the apparatus comprising a control circuitry configured to:
receive a trigger in the media stream;
create a first window of frames in response to receiving the trigger;
receive the first window of frames of the media stream;
determine that the media stream is being played on a portable device;
determine a battery charge percentage of the portable device;
increase a time offset between the first window of frames and a second window of frames based on an inverse proportionality to the battery charge percentage of the portable device;
receive the second window of frames of the media stream;
measure a plurality of metrics relating to the first and the second windows of frames after the increased time offset;
aggregate the plurality of metrics for each window of frames;
determine a window QoE value based on the aggregated plurality of metrics; and
take corrective action on the media stream based on the quality of experience value, wherein the corrective action is selected to change a streaming parameter of a server that provides the media stream.

15. The apparatus of claim 14, wherein the trigger is associated with a point of interest in the media stream, the point of interest being one of: scene complexity, genre, bitrate data, segment complexity, scene content, or historical data.

16. The apparatus of claim 14, wherein the corrective action includes increasing at least one of a bitrate of the media stream or a resolution of the media stream.

17. A non-transitory computer-readable medium having instructions encoded thereon for carrying out a method, the method comprising:
receiving a trigger in the media stream;
creating a first window of frames in response to receiving the trigger;
receiving the first window of frames of the media stream;
determining that the media stream is being played on a portable device;
determining a battery charge percentage of the portable device;
increasing a time offset between the first window of frames and a second window of frames based on an inverse proportionality to the battery charge percentage of the portable device;
receiving the second window of frames of the media stream after the increased time offset;
measuring a plurality of metrics relating to the first and the second windows of frames;
aggregating the plurality of metrics for each window of frames; determining a window quality of experience value based on the aggregated plurality of metrics; and
taking corrective action on the media stream based on the quality of experience value, wherein the corrective action is selected to change a streaming parameter of a server that provides the media stream.

18. The non-transitory computer-readable medium of claim 17, wherein the corrective action includes increasing at least one of a bitrate of the media stream or a resolution of the media stream.

* * * * *